US010479037B2

(12) United States Patent
Sandstrom

(10) Patent No.: US 10,479,037 B2
(45) Date of Patent: Nov. 19, 2019

(54) STIFFNESS ENHANCED TREAD ELEMENT

(71) Applicant: THE GOODYEAR TIRE & RUBBER COMPANY, Akron, OH (US)

(72) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 16 days.

(21) Appl. No.: 15/838,965

(22) Filed: Dec. 12, 2017

(65) Prior Publication Data

US 2018/0099466 A1 Apr. 12, 2018

Related U.S. Application Data

(62) Division of application No. 12/956,204, filed on Nov. 30, 2010, now Pat. No. 9,878,508.

(51) Int. Cl.
| | |
|---|---|
| *B29D 30/58* | (2006.01) |
| *B60C 11/00* | (2006.01) |
| *B29C 48/07* | (2019.01) |
| *B29C 48/12* | (2019.01) |
| *B29C 48/21* | (2019.01) |
| *B29C 48/30* | (2019.01) |
| *B29C 48/305* | (2019.01) |

(Continued)

(52) U.S. Cl.
CPC .............. *B29D 30/58* (2013.01); *B29C 48/07* (2019.02); *B29C 48/12* (2019.02); *B29C 48/21* (2019.02); *B29C 48/30* (2019.02); *B29C 48/307* (2019.02); *B60C 11/00* (2013.01); *B60C 11/005* (2013.01); *B29C 48/19* (2019.02); *B29C 48/355* (2019.02); *B29D 2030/526* (2013.01); *B29K 2021/00* (2013.01); *B29L 2030/002* (2013.01); *B60C 11/0058* (2013.01); *B60C 2011/0025* (2013.01)

(58) Field of Classification Search
CPC ..... B29D 30/58; B60C 11/0058; B29C 48/19; B29C 48/21; B29C 48/30; B29C 48/307
See application file for complete search history.

(56) References Cited

U.S. PATENT DOCUMENTS

| | | | |
|---|---|---|---|
| 4,381,810 A | 5/1983 | Cady et al. | |
| 4,556,382 A | 12/1985 | Nadeau | |

(Continued)

FOREIGN PATENT DOCUMENTS

| | | |
|---|---|---|
| EP | 0131122 A2 | 1/1985 |
| EP | 0160857 A2 | 11/1985 |

(Continued)

OTHER PUBLICATIONS

Machine translation for Japan 2000-079805 (Year: 2019).*
Machine translation for Japan 2001-191766 (Year: 2019).*

*Primary Examiner* — Steven D Maki
(74) *Attorney, Agent, or Firm* — Alvin Rockhill

(57) ABSTRACT

A tire tread may be formed by simultaneously extruding a tread cap formed of a first material and a tread base formed of a second material having a substantially different stiffness property than the first material. One tread element may have a strip of the second material extending from the tread base into the tread cap and, a second tread element may also have a strip of the second material extending from the tread base into the tread cap.

9 Claims, 6 Drawing Sheets

(51) Int. Cl.
   *B29C 48/19*    (2019.01)
   *B29C 48/355*   (2019.01)
   *B29D 30/52*    (2006.01)
   *B29K 21/00*    (2006.01)
   *B29L 30/00*    (2006.01)

(56) References Cited

U.S. PATENT DOCUMENTS

| | | | |
|---|---|---|---|
| 5,176,765 A | 1/1993 | Yamaguchi et al. | |
| 5,343,918 A | 9/1994 | Fontaine | |
| 5,453,238 A | 9/1995 | Bardy | |
| 5,718,782 A | 2/1998 | Fourgon | |
| 6,269,854 B1 | 8/2001 | Matsuo | |
| 6,302,173 B1* | 10/2001 | Mizuno | B60C 1/0016 152/152.1 |
| 6,615,887 B2 | 9/2003 | Denoueix et al. | |
| 6,631,746 B2 | 10/2003 | Neumann | |
| 6,746,227 B2 | 6/2004 | Helle et al. | |
| 6,959,743 B2 | 11/2005 | Sandstrom | |
| 2002/0190417 A1* | 12/2002 | Helle | B60C 19/08 264/104 |
| 2002/0190420 A1 | 12/2002 | Benatti | |
| 2005/0167019 A1 | 8/2005 | Puhala et al. | |
| 2007/0017617 A1 | 1/2007 | Lafrique et al. | |
| 2007/0187013 A1 | 8/2007 | Losi et al. | |
| 2008/0105353 A1* | 5/2008 | Losi | B29D 30/60 152/537 |
| 2009/0242091 A1 | 10/2009 | Puhala et al. | |
| 2010/0059156 A1 | 3/2010 | Cambron et al. | |
| 2010/0092589 A1 | 4/2010 | Clausse | |

FOREIGN PATENT DOCUMENTS

| | | |
|---|---|---|
| EP | 1745946 A2 | 1/2007 |
| EP | 2052880 A1 | 4/2009 |
| EP | 2163403 A2 | 3/2010 |
| JP | 2000-079805 A * | 3/2000 |
| JP | 2000079805 A | 3/2000 |
| JP | 2001-191766 A * | 7/2001 |
| JP | 2001191766 A | 7/2001 |
| WO | 2004/096583 A1 | 11/2004 |
| WO | 2005/063509 | 7/2005 |

* cited by examiner

STIFFNESS ENHANCED TREAD ELEMENT

This is a divisional of U.S. patent application Ser. No. 12/956,204, filed on Nov. 30, 2010. The teachings of U.S. patent application Ser. No. 12/956,204 are incorporated herein by reference in their entirety.

I. BACKGROUND

A. Field of Invention

This invention generally relates to methods and apparatuses concerning pneumatic tires and more specifically to methods and apparatuses concerning a pneumatic tire having a tread with strips of tread base material having a higher stiffness property that extend into the tread cap material having a lower stiffness property.

B. Description of the Related Art

It is known to those of skill in the art that the overall performance of a pneumatic tire's tread pattern (including performance criteria such as wet handling, dry handling and stopping) may be compromised by the stiffness characteristics of the tread elements. Known methods of increasing the stiffness of a tread element include using relatively stiffer tread base materials and using relatively stiffer tread cap materials. These methods typically have the disadvantage, however, of compromising other tread performance criteria.

It is also known, as taught in International Publication No. WO 2005/063509, to provide a tire tread having sectors formed with a first material having a first modulus of elasticity and other sectors formed with a second material having a second modulus of elasticity. A problem with this method, however, is that the tire carcass must be moved sequentially from a first station where the first material is applied and then to a second station where the second material is applied. This method thus has disadvantages of increased complexity and increased cost.

What is needed is a method of increasing the stiffness characteristics of tire tread elements while minimizing the known disadvantages.

II. SUMMARY

According to one embodiment of this invention, a method of forming a pneumatic radial tire may comprise the steps of: (A) providing a radial green tire carcass comprising a crown region and pair of sidewalls; (B) forming a green tire tread by simultaneously extruding a tread cap formed of a first material and a tread base formed of a second material having a substantially higher stiffness property than the first material; wherein step (B) comprises the step of: providing the green tire tread with: (1) a first portion having a first strip of the second material extending from the tread base into the tread cap; and, (2) a second portion having a second strip of the second material extending from the tread base into the tread cap; (C) applying the green tire tread to the crown region of the radial green tire carcass to form a green tire; and, (D) vulcanizing the radial green tire to form a pneumatic radial cured tire that comprises a tread having: (1) a first shoulder tread element comprising the first strip extending from the tread base into the tread cap, wherein the first shoulder tread element has a stiffness property significantly different from the stiffness property of the first shoulder tread element if the first shoulder tread element was formed only of the first material; and, (2) a second shoulder tread element comprising the second strip extending from the tread base into the tread cap, wherein the second shoulder tread element has a stiffness property significantly different from the stiffness property of the second shoulder tread element if the second shoulder tread element was formed only of the first material.

According to another embodiment of this invention, a tire may comprise: a carcass; and, a tread comprising: (1) a tread cap formed of a first material; (2) a tread base formed of a second material having a substantially different stiffness property than the first material; (3) a first tread element having a first strip of the second material that extends from the tread base through the tread cap to an outer ground contacting surface of the tread; and (4) a second tread element having a second strip of the second material that extends from the tread base through the tread cap to an outer ground contacting surface of the tread. The tread may be formed by simultaneously extruding the tread cap and the tread base to include the first and second strips.

According to yet another embodiment of this invention, a tire may comprise: a carcass; and, a tread comprising: (1) a tread cap formed of a first material; (2) a tread base formed of a second material having a substantially higher stiffness property than the first material; (3) a first tread element having a first strip of the second material that extends from the tread base into the tread cap; and (4) a second tread element having a second strip of the second material that extends from the tread base into the tread cap. The tread may be formed by simultaneously extruding the tread cap and the tread base to include the first and second strips. The first tread element may have a stiffness property significantly greater than the stiffness property of the first tread element if the first tread element was formed only of the first material and the second tread element may have a stiffness property significantly greater than the stiffness property of the second tread element if the second tread element was formed only of the first material.

One advantage of this invention is that different portions of a tire tread can be easily adjusted to have different stiffness properties.

Another advantage of this invention is that the tire tread can be easily formed at a single station.

Other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DEFINITIONS

"Apex" means a non-reinforced elastomer positioned radially above a bead core.

"Axial" and "axially" mean lines or directions that are parallel to the axis of rotation of the tire. "Axially inward" means lines or directions that are parallel to the axis of rotation of the tire and relatively toward the inside of the tire. "Axially outward" means lines or directions that are parallel to the axis of rotation of the tire and relatively toward the outside of the tire.

"Bead" means that part of the tire comprising an annular tensile member and shaped to fit the design rim.

"Carcass" means the tire structure apart from the belt structure, tread, undertread, and sidewall rubber, but including the beads and plies.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Ply" means a continuous layer of rubber-coated parallel cords.

"Radial" and "radially" mean directions radially toward or away from the axis of rotation of the tire.

"Radial tire" means a belted or circumferentially-restricted pneumatic tire in which the ply cords (which may or may not extend from bead to bead) are laid at cord angles between 65 degrees and 90 degrees with respect to the equatorial plane of the tire.

"Tread" means an extruded rubber component which, when bonded to the rest of the tire, includes that portion of the tire that comes into contact with the road when the tire is normally inflated and under normal load, that is, the footprint.

V. DETAILED DESCRIPTION OF EXAMPLE EMBODIMENTS OF THE INVENTION

Figure 1:
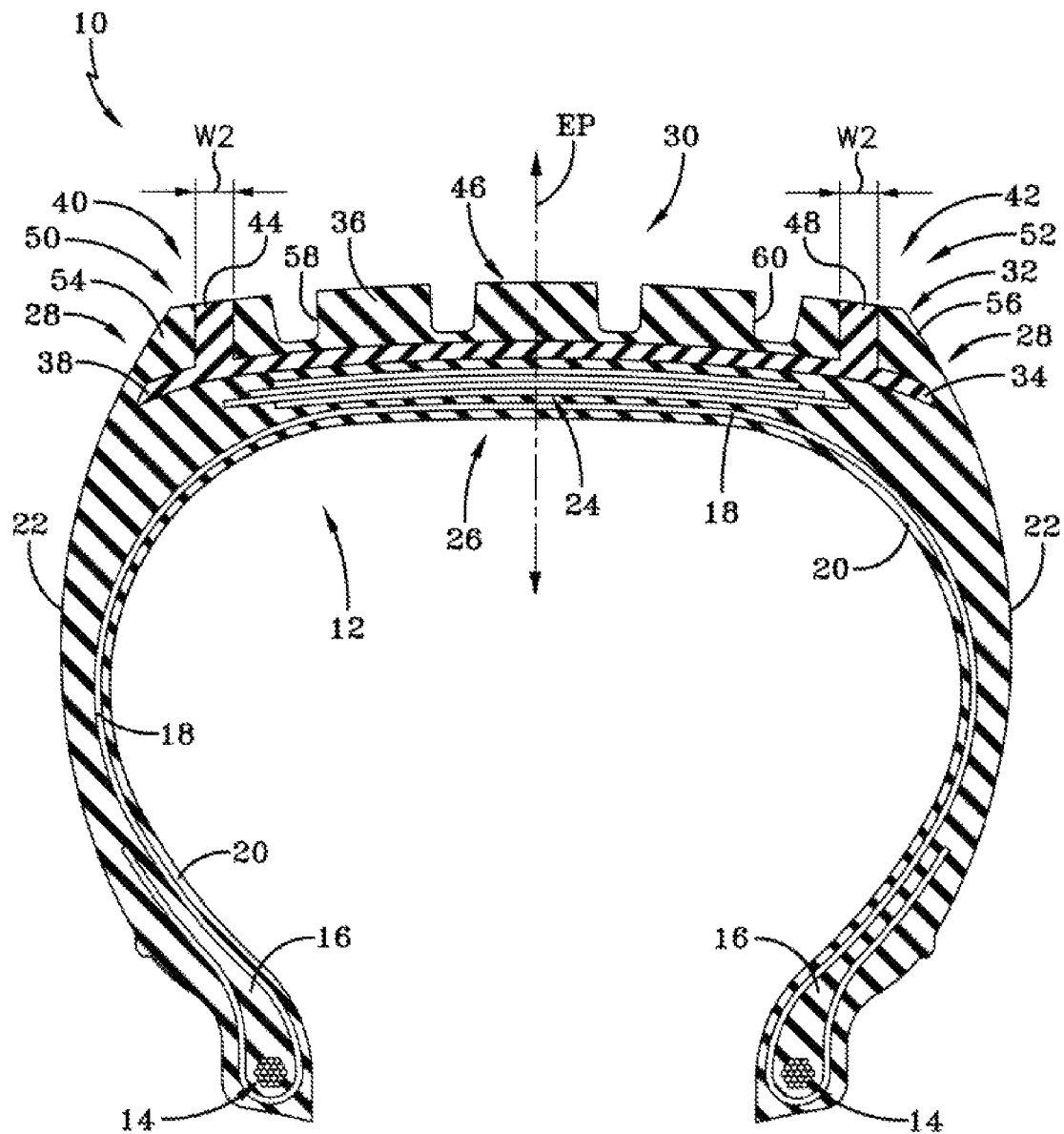
FIG. 1 is a cross-section of a first example tire constructed in accordance with this invention.

Referring now to the drawings wherein the showings are for purposes of illustrating embodiments of the invention only and not for purposes of limiting the same, and wherein like reference numerals are understood to refer to like components, FIG. 1 shows a pneumatic tire 10 having a tread 30 according to one embodiment of this invention. The tread 30 may be positioned onto a carcass 12 of any conventional design. The carcass 12 may include a pair of annular beads 14, 14 and a pair of apexes 16, 16 positioned radially above the first and second annular beads 14, 14, respectively. The carcass 30 may also include one or more plies 18 that may extend from around the beads 14, 14, as shown. The carcass 30 may define a crown region 26 and a pair of sidewalls 28, 28. Other conventional components may be positioned on the carcass 12 such as an inner liner 20, sidewall rubber portions 22, 22 and a belt package 24. Because a tire carcass and these other components are well known to those of skill in the art, further details will not be provided here.

Figure 5:
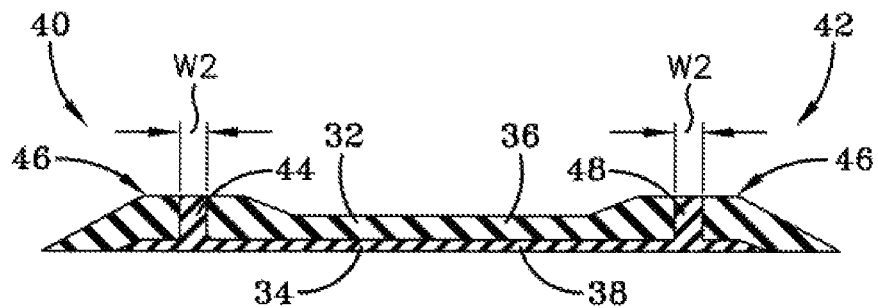
FIG. 5 is a sectional view of the extruded tread taken along the plane of line 5-5 in FIG. 4.
Figure 6:
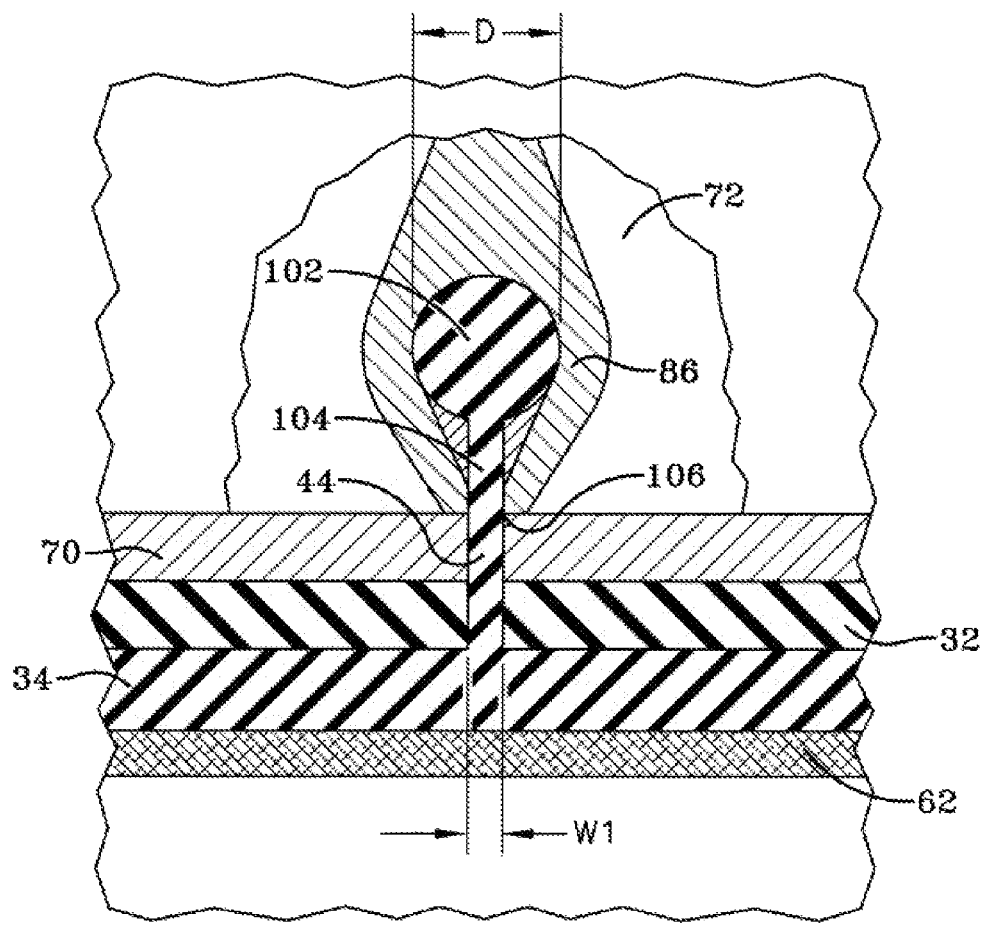
FIG. 6 is an enlarged fragmentary plan view of the first block of FIG. 3 taken along the plane of line 6-6 in FIG. 4 with parts being broken away.
Figure 7:
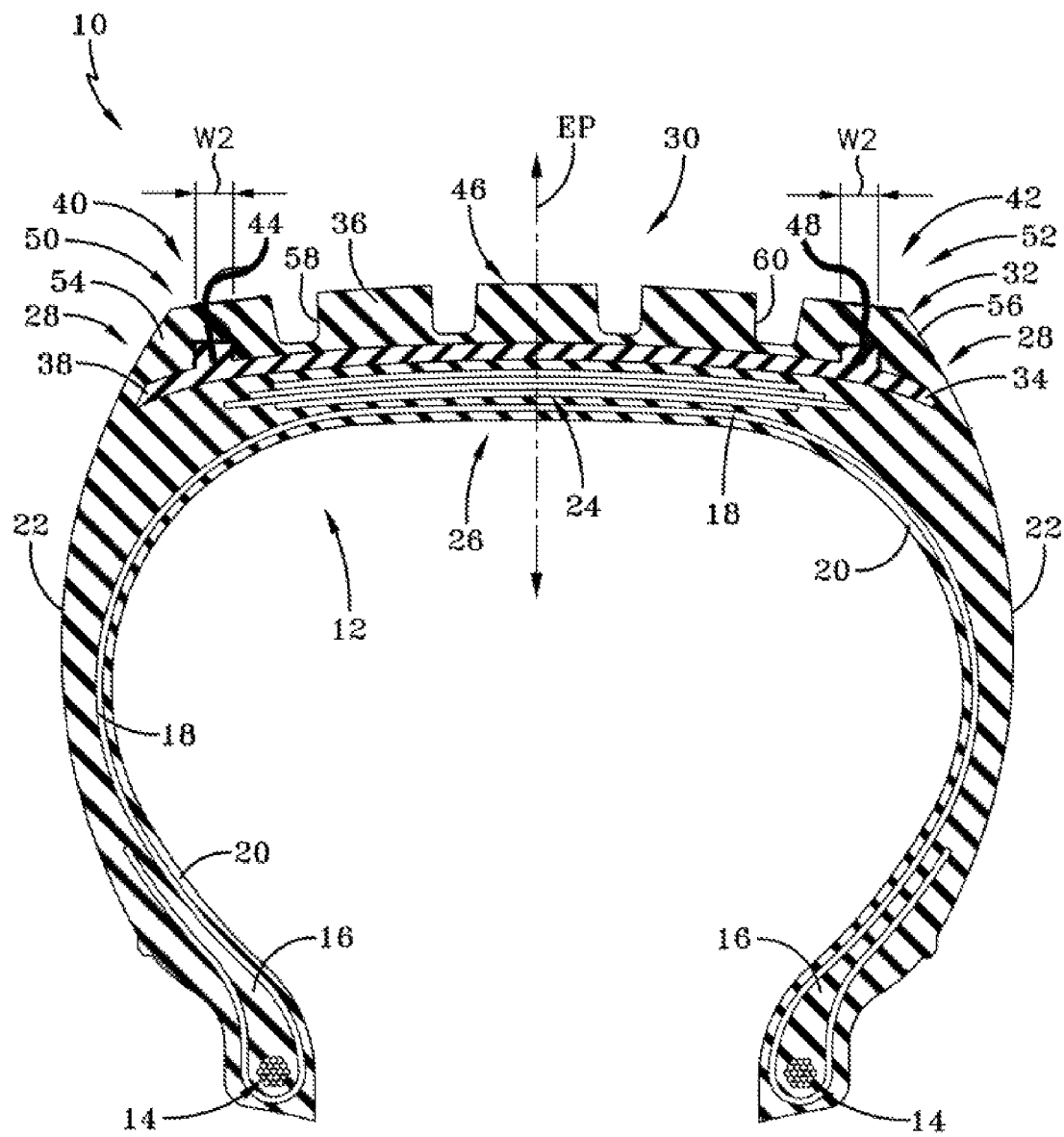
FIG. 7 is a view similar to that shown in FIG. 1 but with the strips of second material extending only into the tread cap, not through the tread cap.

A tire tread 30 made according to one embodiment of this invention is shown in its green (uncured) state in FIG. 5 and in its cured state in FIG. 1. The tread 30 may have a tread cap 32 formed of a first material 36 and a tread base 34 formed of a second material 38. The first material 36 may have a stiffness property (modulus of elasticity) substantially different than the second material 38. In one embodiment, the second material 38 has a substantially higher stiffness property than the first material 36. The second material may be extended into the first material sufficiently to significantly change the stiffness property of the corresponding tread element (as compared to the tread element if it was formed only of the first material). In one embodiment, shown in FIG. 7, the tread 30 may have a first portion 40 having a first strip 44 of the second material 38 that extends from the tread base 34 into the tread cap 32 and a second portion 42 having a second strip 48 of the second material 38 that extends from the tread base 34 into the tread cap 32. In another embodiment, shown in FIGS. 1 and 5, the tread 30 may have a first portion 40 having a first strip 44 of the second material 38 that extends from the tread base 34 through the tread cap 32 to an outer ground contacting surface 46 of the tread 30 and a second portion 42 having a second strip 48 of the second material 38 that extends from the tread base 34 through the tread cap 32 to an outer ground contacting surface 46 of the tread 30. While the locations for the first and second strips 44, 48 on the tread 30 can be any chosen with the sound judgment of a person of skill in the art, for the embodiment shown the first strip 44 is positioned in a first shoulder 50 on the tread 30 and the second strip 48 is positioned in a second shoulder 52. In this embodiment of the invention the first strip 44 is not encompassed by any circumferential tread groove and the second strip 48 is not encompassed by any circumferential tread groove. As is known to those of skill in the art, the shoulders 50, 52 are good locations to adjust the tread stiffness so as to affect several tire performance characteristics. It should be noted that while the strips 44, 48 that are described so far are positioned axially midway within tread elements 54, 56 it is also contemplated to position the strips in tread elements nearby tread grooves or to encompass tread grooves, such as shown with grooves 58, 60 in FIG. 2. While the strips shown 44, 48 number only two and are symmetrical with respect to the equatorial plane EP, it is contemplated to use any number of strips that may, or may not, be symmetrical with respect to the equatorial plane EP.

Figure 3:
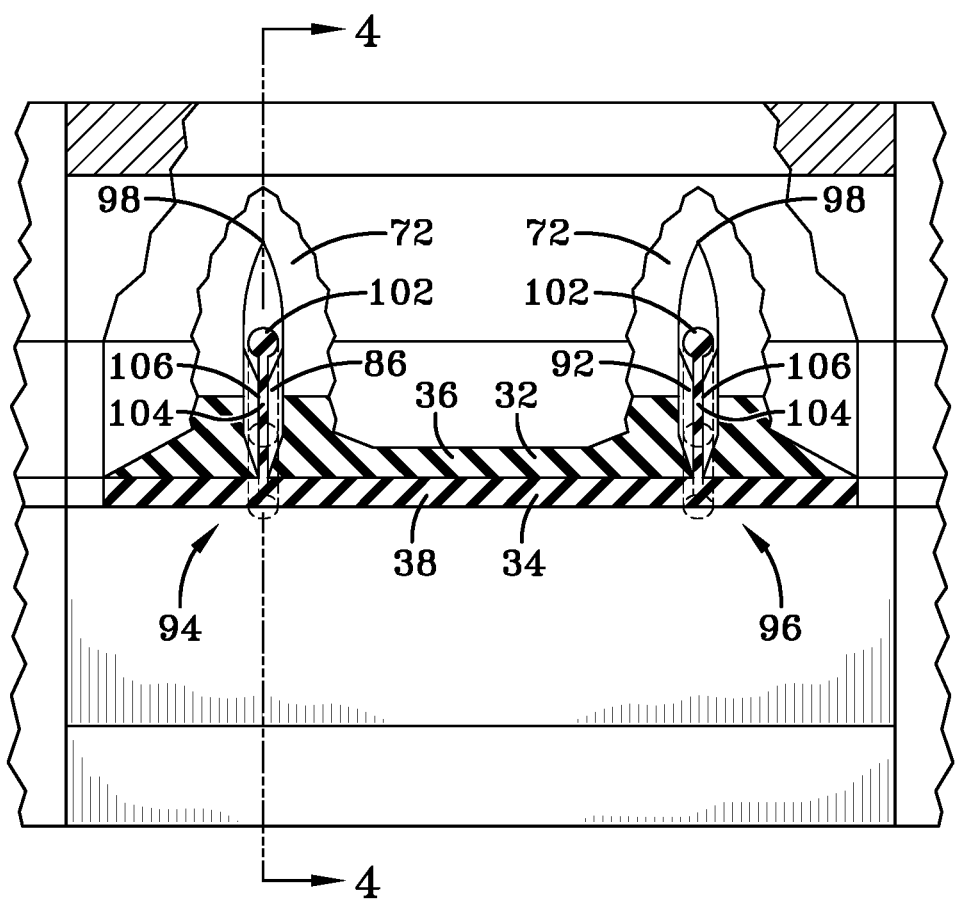
FIG. 3 is a fragmentary front elevation of a tire tread splice bar with a first block with parts being broken away taken along the plane of line 3-3 in FIG. 4 but also showing a second block also with parts being broken away.
Figure 4:
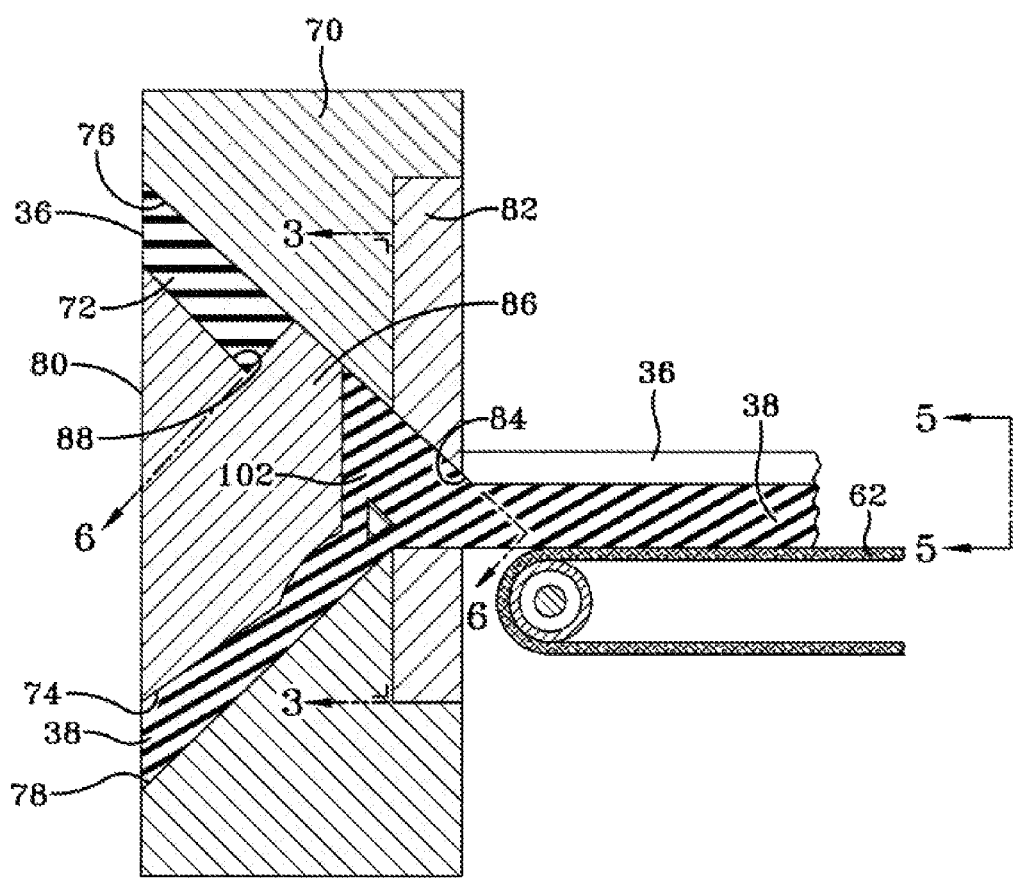
FIG. 4 is a sectional view taken along the plane of line 4-4 in FIG. 3 showing a conveyor for receiving the extruded tread.

A method of forming a tire tread 30 according to this invention may be somewhat similar to the method provided in U.S. Pat. No. 6,746,227 titled Tire Tread Die which is commonly owned and which is incorporated herein by reference. However, it should be noted that U.S. Pat. No. 6,746,227 teaches only the use of very thin strips of conductive compound to conduct static charge. FIGS. 3 and 4 show a tire tread die 70 having a tread cap passage 72 and a tread base passage 74 in communication with rubber extruders (not shown) that simultaneously feed or flow the first material 36 and the second material 38 into the tread die 70 at extruder openings 76 and 78, respectively. In this way the tire carcass 12 does not have to be moved to various stations as required in the prior art. The tread cap passage 72 and the tread base passage 74 may extend from spaced apart positions at an extruder side 80 to a final die 82 having a final tread shaping opening 84.

With reference now to FIGS. 3-6, a first block 86 may be mounted in a first area 94 of the tread cap passage 72 and may extend from an inner surface 88 of the tread cap passage 72 to surface 90 of the tread cap passage 72. A second block 92 may similarly be mounted in a second area 96 of the tread cap passage 72 and may extend from an inner surface (not shown) of the tread cap passage 72 to a surface (not shown) of the tread cap passage 72. The first and second areas 94, 96 of the tread cap passage 72 may, in one embodiment, correspond to the first and second shoulders 50, 52 on the tread 30. Each block 86, 92, may have a flow separating protrusion such as a flow splitting tapered upstream edge 98 for diverting the flow of the first material 36 around each block 86, 92. Additional blocks can be added as required. Each block 86, 92 may have an opening 102 that extends from one end of the block to an opposite end. Communication of the tread base passage 74 with the block openings 42, 42 may be provided in any manner chosen with the sound judgment of a person of skill in the art.

With reference now to FIGS. 1-6, in one embodiment, in order to form the first and second strips 44, 48 of the second material 38 (used to form the tread base 34) into the first material 36 (used to form the tread cap 32), slots 104, 104 may be cut in downstream sides 106, 106 of the blocks 86, 92. The slots 104, 104 may extend between opposite ends of each block 86, 92, as shown. The diameter D of a block opening 102 and the width W1 of the slot 104 may vary according to the tire performance desired by the tire designer. In one embodiment, the width W1 of the slot 104 and the diameter D of the opening 102 are sized, depending on the specific materials used to form the tread base 34 and tread cap 32, to produce strips 44, 48 to have a width W2 of at least 3 millimeters (mm) when the second material 38 is green (uncured), as shown in FIG. 5. In another embodiment, the strips 44, 48 have a width W2 of at least 5 mm when the second material 38 is green. In yet another embodiment, the strips 44, 48 have a width W2 of at least 3 mm when the second material 38 is cured, as shown in FIG. 1. In another embodiment, the strips 44, 48 have a width W2 of at least 5 mm when the second material 38 is cured. It is also contemplated to produce the first strip 44 to have a width that is different from the width of the second strip 48.

Figure 2:
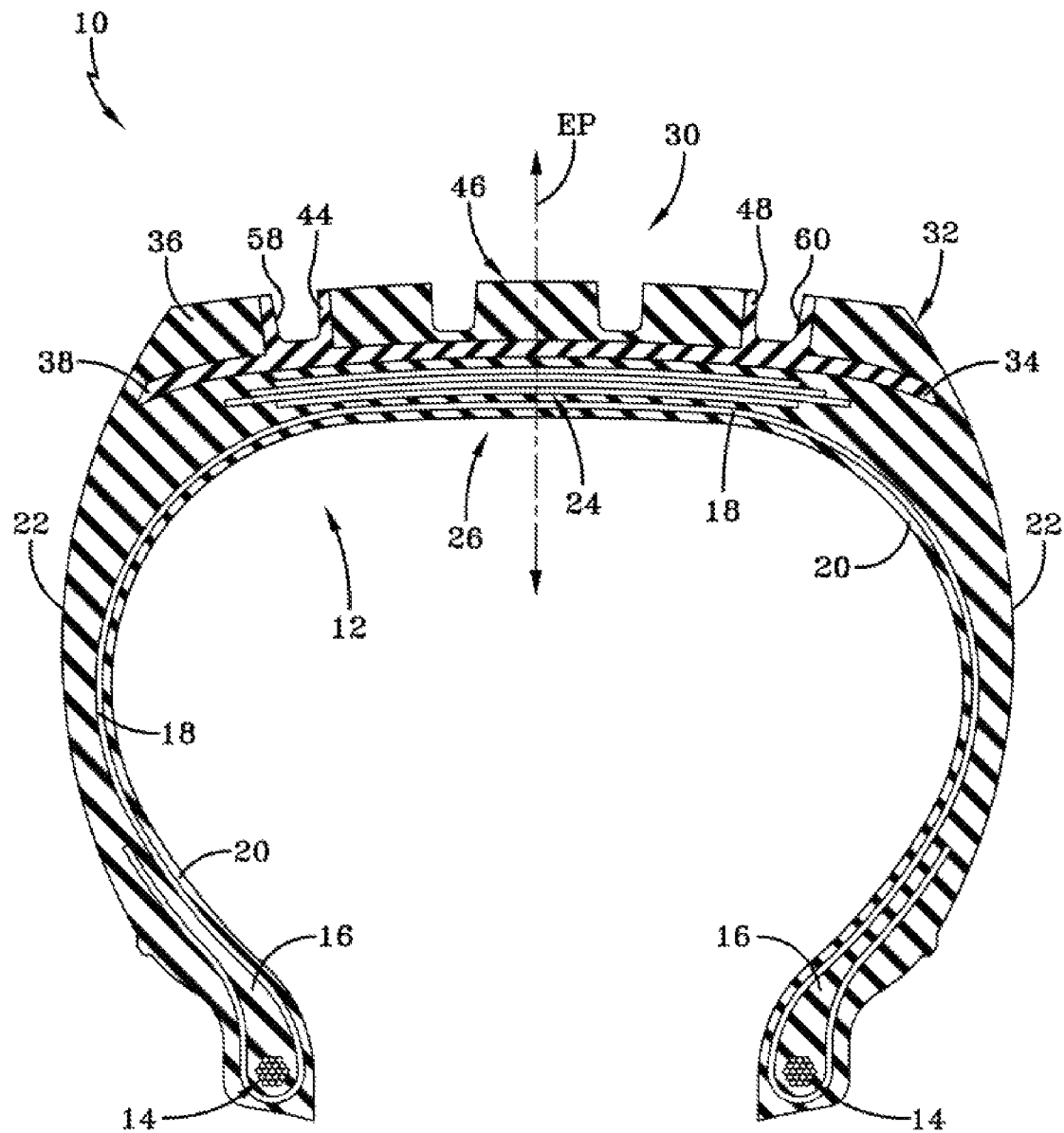
FIG. 2 is a partial cross-section of a second example tire constructed in accordance with this invention.

As shown in FIG. 4, a conveyor 62 may be provided to convey the green tire tread 30, having an outer surface 46, to a suitable cutting station where the tread is cut to length. The tread 30 may then be conveyed to a tire building machine where it is applied to the crown region 26 of the carcass 12 in a manner well known to those skilled in the art. The assembled tire is then placed in a tire mold where it is vulcanized to form the cured tire 10, as shown in FIGS. 1 and 2. While the tread 30 of this invention can be applied to any style and size of tire chosen with the sound judgment of a person of skill in the art, in one embodiment it is used with a pneumatic radial tire.

Stiffness property data was obtained as follows (according to Rubber Process Analyzer as RPA 2000™ instrument by Alpha Technologies at 100° C. and 1 Hertz) where kPa is kilopascal:

cap material G'@10%: 250 to 3,000 kPa; preferred range: 500 to 2500 kPa base material: 1,000 to 8,000 kPa; preferred range 1,500 to 5,000 kPa delta stiffness difference: greater than 500 kPa; preferred greater than 1,000 kPa Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method of forming a pneumatic radial tire comprising the steps of:
   (A) providing a radial green tire carcass comprising a crown region and pair of sidewalls;
   (B) forming a green tire tread by simultaneously extruding a tread cap formed of a first material and a single tread base formed of a second material having a stiffness of at least 1000 kPa more than the stiffness of the first material, and wherein the second material has a G'@10% which is within the range of 1,500 kPa to 8,000 kPa as measured at 100° C. and 1 Hz;
   wherein step (B) comprises the step of: providing the green tire tread with: (1) a first portion having a first strip of the second material extending from the tread base into the tread cap; and, (2) a second portion having a second strip of the second material extending from the tread base into the tread cap;
   (C) applying the green tire tread to the crown region of the radial green tire carcass to form a green tire; and,
   (D) vulcanizing the radial green tire to form a pneumatic radial cured tire that comprises a tread having: (1) a first shoulder tread element comprising the first strip extending from the tread base into the tread cap; and, (2) a second shoulder tread element comprising the second strip extending from the tread base into the tread cap, wherein the tread cap includes circumferential tread grooves and extends from a first shoulder of the tire to a second shoulder of the tire, wherein the circumferential tread grooves are encompassed within the tread cap, wherein the tread base extends from the first shoulder of the tire to the second shoulder of the tire, wherein the cured tire includes a first tread element having a first strip of the second material that extends from the tread base through the tread cap to an outer ground contacting surface of the tread, wherein the first tread element is located on the first shoulder of the tire; and wherein the first strip is not encompassed by any circumferential tread groove, and wherein the first strip is encompassed within the tread cap, wherein the cured tire includes a second tread element having a second strip of the second material that extends from the tread base through the tread cap to an outer ground contacting surface of the tread, wherein the second tread element is located on the second shoulder of the tire; wherein the second strip is not encompassed by any circumferential tread groove, and wherein the second strip is encompassed within the tread cap, wherein the only strips of the second material which extend from the tread base through the tread cap to the outer ground contacting surface of the tread are located on the first shoulder and the second shoulder of the tire, and wherein the tread is formed by simultaneously extruding the tread cap and the tread base to include the strips.

2. The method of forming the pneumatic radial tire of claim 1 wherein step (B) comprises the steps of:
   providing a tire tread die comprising: first and second passages; and, first and second blocks mounted in the first passage, wherein each block extends into the first passage and has an opening;
   flowing the tread cap material through the first passage and around the first and second blocks; and, flowing the tread base material: (1) through the second passage; (2) through the opening in the first block to create the first strip; and, (3) through the opening in the second block to create the second strip.

3. The method of forming the pneumatic radial tire of claim 1 wherein a belt package positioned between the carcass and the tread of the green tire.

4. The method of forming the pneumatic radial tire of claim 1 wherein the strips have a width of at least 3 millimeters.

5. The method of forming the pneumatic radial tire of claim 1 wherein the strips have a width of at least 5 millimeters.

6. The method of forming the pneumatic radial tire of claim 1 wherein the first shoulder of the tire is located axially inward from the most axially inward circumferential groove on the tread of the tire; and wherein the second shoulder of the tire is located axially outward from the most axially outward circumferential groove on the tread of the tire.

7. The method of forming the pneumatic radial tire of claim 1 wherein the first material has a G'@10% which is within the range of 250 kPa to 3,000 kPa as measured at 100° C. and 1 Hz.

8. The method of forming the pneumatic radial tire of claim 7 wherein the second material has a G'@10% which is within the range of 2,000 kPa to 8,000 kPa as measured at 100° C. and 1 Hz.

9. The method of forming the pneumatic radial tire of claim 1 wherein the first material has a G'@10% which is within the range of 500 kPa to 2,500 kPa as measured at 100° C. and 1 Hz; and wherein the second material has a G'@10% which is within the range of 1,500 kPa to 5,000 kPa as measured at 100° C. and 1 Hz.

* * * * *